United States Patent

[11] 3,613,972

[72] Inventor Daniel W. Daughhetee
    Hazelton, Kans. 67061
[21] Appl. No. 877,086
[22] Filed Nov. 17, 1969
[45] Patented Oct. 19, 1971

[54] SPARE TIRE BRACKET APPARATUS
    10 Claims, 11 Drawing Figs.
[52] U.S. Cl. .................................................. 224/42.24
[51] Int. Cl. .................................................. B60r 9/02
[50] Field of Search ........................................ 224/42.06,
                                                            42.24, 42.25

[56] References Cited
    UNITED STATES PATENTS
    1,492,288  4/1924  Druar ........................... 224/42.24 X
    3,204,840  9/1965  Bowen .......................... 224/42.24

Primary Examiner—Gerald M. Forlenza
Assistant Examiner—Robert J. Spar
Attorney—Phillip A. Rein ABSTRACT: This invention relates to a spare tire bracket apparatus mountable within the rear end of a pickup truck or the trunk of an automobile including a support assembly secured to a support surface by an anchor assembly and a tire connector assembly secured to the anchor assembly which is readily mountable within a wheel member on a spare tire structure and movable into a locked condition preventing the same from being removed. More particularly, this invention relates to a tire connector assembly including a yoke assembly secured to a support assembly and having a threaded member operably connected to a lock clamp assembly wherein the lock assembly is movable from a nonuse to an attachment condition to secure a tire member thereto.

PATENTED OCT 19 1971

INVENTOR.
Daniel W. Daughhetee
BY.
Phillip A. Rein
ATTORNEY

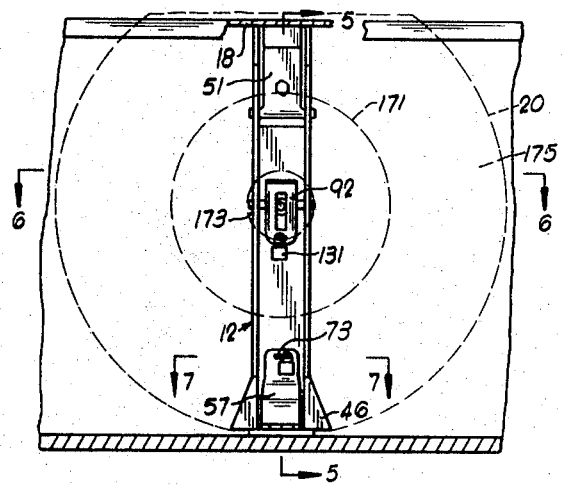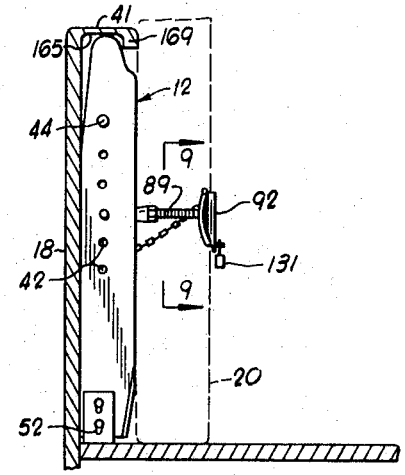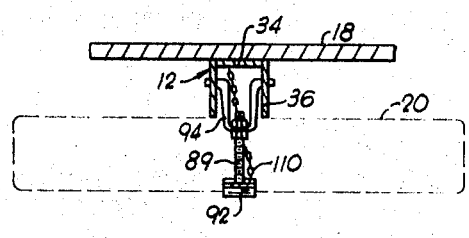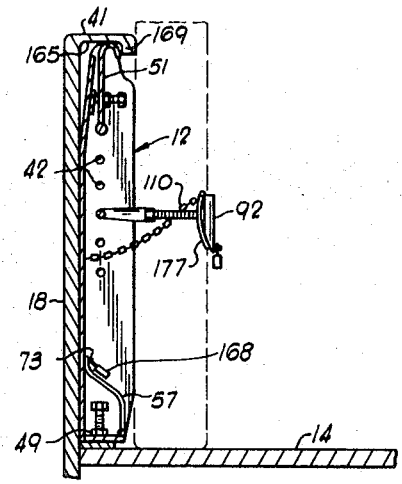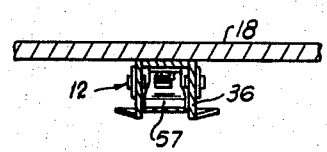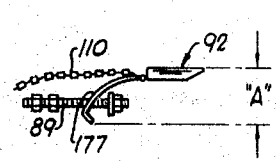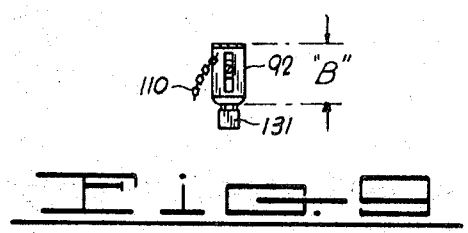
INVENTOR.
Daniel W. Daughhetee
BY.
*Phillip A. Bair*
ATTORNEY INVENTOR.
Daniel W. Doughhetee
BY.
Phillip A. Rein
ATTORNEY

SPARE TIRE BRACKET APPARATUS

In the more recent models of pickup truck structure being manufactured, it is noted that the spare tire structures are carried underneath the rear end portion of the truck bed body and secured thereto by lock bolts or the like. With such attachment of the spare tire structure, it has been found that the same is subject to snow, splashing mud, etc. whereupon the bolt members anchoring the same become corroded and difficult to remove plus damaging to the spare tire structure. Additionally, when mounted under the rear end portion of the truck body structure, it is found that a person is required to slide underneath this portion and many times the bolt members have to be removed with a torch member to release the spare tire structure which is quite unsatisfactory to one having a flat tire in a rural area.

Numerous types of tire carrier structures are known to the prior art operable to secure a spare tire member to a vehicle trunk area or to a side portion of a pickup truck structure. However, it is to be noted that none of the prior art devices are operable so as to be easily attached to a side of a pickup truck structure and having a means for securely locking the same to prevent unauthorized removal of both the spare tire bracket apparatus and the spare tire structure. It is found that the spare tire carrier devices of the prior art are not operable so as to be readily mountable within the bed area of pickup trucks regardless of the vertical and lateral spacing of the sidewalls thereof but are specifically built for a particular type of receiving structure. Additionally, it is found that none of the prior art devices are operable in a manner for easily attaching and anchoring a spare tire structure to a pickup truck structure or the trunk area of an automobile requiring a minimum amount of time and effort.

In one preferred embodiment of this invention, a spare tire bracket apparatus is provided which may be readily attached to the bed area of a pickup truck structure and, more specifically, secured to an inner sidewall thereof. The spare tire bracket apparatus includes a main support assembly; an anchor assembly connected to the support assembly for adjustably securing the same to the sidewall of the pickup truck structure; and a tire connector assembly adjustably connected to the support assembly and having means for anchoring to a spare tire structure. More particularly, the support assembly includes a main body member having upper and lower anchor sections thereon. The main body member is of a generally U-shape in transverse cross section having a plurality of aligned spaced holes adapted to pivotally receive the tire connector assembly therein. The lower anchor section is provided with a support baseplate welded between the lower open ends of the main body member and having adjacent sidewalls provided with aligned adjustment guide slot portions. The anchor assembly includes a vertical support assembly secured to the lower end of the main body member and a lateral support assembly secured to the upper end of the main body member. The vertical support assembly includes a first adjustable support bracket connected to the main body member by guide bolts; an adjustable nut and bolt member to control spacing of the support bracket from the support baseplate; and a main guard cover pivotally connected to the lower end of the support baseplate. The nut member is welded to the bottom wall of the main body member so as to threadably receive the bolt member therein for adjustable movement. The guard cover is provided with a slot to receive a hook member secured to the main body member which, in turn, the hook member is adapted to receive a padlock member to prevent unauthorized access to the adjustable bolt member. The lateral support assembly includes an adjustment plate pivotally connected to the sidewalls of the main body member and an actuator nut and bolt member mounted thereon. The actuator nut and bolt member is provided with a nut member secured to a central portion of the adjustment plate to overlap a hole therein and receives the bolt member therein to provide for relative lateral movement for clamping within an upper ledge of the sidewall of the pickup truck structure. The tire connector assembly includes a main yoke assembly mountable within the holes in the main body member; a threaded connector rod adjustably connected to the yoke assembly; and a lock clamp assembly connected to the outer end of the threaded connector rod. The outer end of the connector rod is adapted to receive the lock clamp assembly and releasably secured thereto through a lock nut and a lock washer member. The lock clamp assembly includes a main curved baseplate secured as by a hinge section to an outer cover plate member and having a guard chain connected as by welding to the baseplate and to the main body member to limit rotation thereof. The baseplate is provided with a central slot to receive the connector rod and an outer U-shaped hook section to be received within a slot on the cover plate which, in turn, will receive a padlock member thereon. The cover plate is provided with a main body with central slot and downwardly depending sidewalls so as to provide protective cover to the lock nut and washer member when in the clamped condition to prevent unauthorized removal. The guard chain limits rotation of the lock clamp assembly to prevent removal of the spare tire structure.

In a second embodiment of a spare tire bracket apparatus of this invention, a support assembly is provided which is secured through an anchor assembly to the rear area of an automobile trunk and having a tire connector assembly thereon releasably connectable to a spare tire structure. The operation and structure of the tire connector assembly of the second embodiment is identical as described for the first embodiment and provides means for readily connecting to the spare tire structure to prevent unauthorized removal without releasing of a padlock member.

One object of this invention is to provide a spare tire bracket apparatus overcoming the aforementioned disadvantages of the prior art structures.

Another object of this invention is to provide a spare tire bracket apparatus having means for readily connecting the same to the sidewall of the pickup truck structure so as to attach a spare tire structure thereto and prevent its unauthorized removal.

One other object of this invention is to provide a spare tire bracket apparatus having means for connecting to a sidewall of a pickup truck structure providing substantial vertical and lateral stability.

Still, one further object of this invention is to provide a spare tire bracket apparatus readily connectable to a vehicle structure and having the tire connector assembly which is readily mountable through a central opening in a wheel member of a spare tire structure and movable into a locked condition.

Still, one other object of this invention is to provide a spare tire bracket apparatus readily mountable within the trunk area of a vehicle having a tire connector assembly connectable to a wheel member of a spare tire structure which is easy to connect; provides means for preventing its unauthorized removal; can be easily detached for removing of the spare tire member; and presents a compact structure when in the nonusage condition.

Still, another object of this invention is to provide a spare tire bracket apparatus which is easily attachable to trunk areas or bed areas of pickup truck structures requiring a minimum amount of tools to do so; economical to manufacture; sturdy in construction; substantially maintenance free; and provides easy access to the spare tire structure.

Various other objects, advantages, and features of the invention will become obvious to those skilled in the art from the discussion, taken in conjunction with the accompanying drawings, in which:

FIG. 3 is a fragmentary elevational view of the pickup truck structure illustrating the spare tire bracket assembly of this invention mounted therein;

FIG. 4 is a fragmentary sectional view of a pickup truck structure showing a side elevational view of a spare tire bracket apparatus of this invention;

FIG. 5 is a fragmentary sectional view taken along line 5—5 in FIG. 3;

FIG. 6 is a fragmentary sectional view taken along line 6—6 in FIG. 3;

FIG. 7 is a fragmentary sectional view taken along line 7—7 in FIG. 3;

FIG. 8 is a fragmentary side elevational view of a tire connector assembly of a spare tire bracket apparatus of this invention;

FIG. 9 is a sectional view of the tire connector assembly taken along line 9—9 in FIG. 4;

Figure 1:
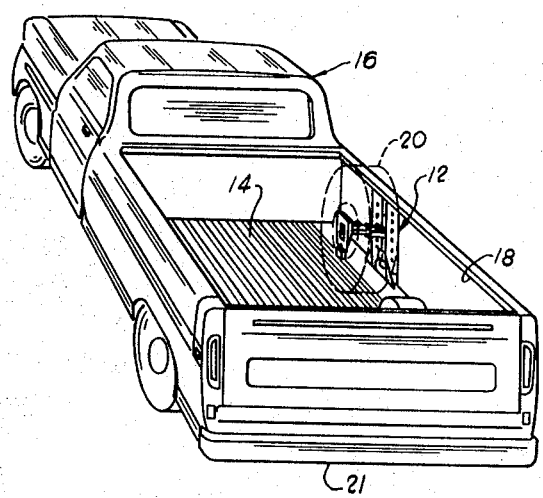
FIG. 1 is a perspective view of a pickup truck structure having the spare tire bracket apparatus of this invention mounted therein and illustrating a spare tire structure in dotted lines.

The following is a discussion and description of preferred specific embodiments of the new spare tire bracket apparatus of this invention, such being made with references to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a spare tire bracket apparatus of this invention, indicated generally at 12, is shown as mounted in a rear bed section 14 of a pickup truck structure 16 and, more specifically, connected to one sidewall 18 thereof. It is noted that the spare tire bracket apparatus 12 operates to secure a spare tire structure 20 thereto which is indicated in dotted lines in FIG. 1. Normally, the spare tire structure 20 is mounted underneath a rear portion 21 of the bed section 14 which is the undesirable feature that this invention overcomes. The spare tire bracket apparatus 12 includes a main support assembly 24; an anchor assembly 26 secured to the support assembly 24 to provide vertical and lateral stability in attaching the same to the sidewall 18; and a tire connector assembly 28 to secure the spare tire structure 20 against the side wall 18 and a portion of the bracket apparatus 12.

Figure 2:
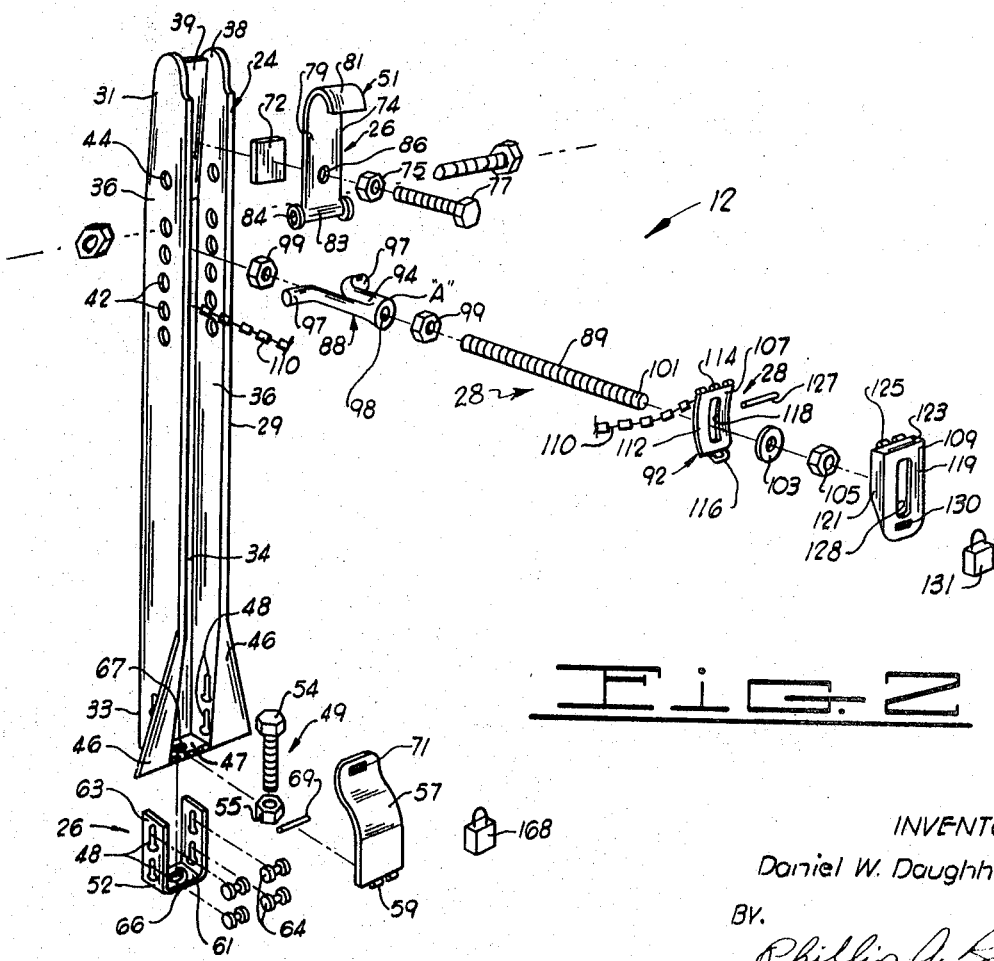
FIG. 2 is an enlarged exploded perspective view of a spare tire bracket apparatus of this invention.

As shown in FIG. 2, the support assembly 24 includes a main elongated body member 29 having upper and lower anchor sections 31 and 33, respectively, connected thereto. The main body member 29 is of a generally U-shape in transverse cross section having a support base 34 with outwardly extended parallel leg members 36. The upper end of the leg members 36 are provided with parallel arcuate portions 38 having an inclined guide plate 39 secured therebetween so as to be readily mountable within an upper ledge 41 of the sidewall 18 of the pickup truck structure 16 in a manner to be explained. The main body member 29 is provided with a plurality of aligned adjustment holes 42 and a pair of connector holes 44 in the parallel leg members 36. A lower portion of the main body member 29 is provided with laterally extended wing members 46 secured to a forward portion of the leg members 36. Additionally, the lower adjacent ends of the base 34 and the leg members 36 are interconnected through a support baseplate 47. The lower portions of the parallel leg members 36 are provided with two sets of aligned connector and guide slots 48 to receive a portion of the anchor assembly 26 therein.

The anchor assembly 26 includes a first vertical support assembly 49 secured to the lower portion of the main body member 29 and a lateral support assembly 51 secured to an upper portion of the main body member 29. The vertical support assembly 49 includes an adjustable support bracket 52 mounted about the lower ends of the leg members 36 for adjustable movement; an adjustable bolt member 54 and a nut member 55 connected to the baseplate 47 of the main body member 29; and a guard cover 57 pivotally connected as by hinge section 59 to the baseplate 47. The adjustable support bracket 52 is of a generally U-shape having a base section 61 integral with upright leg sections 63 snugly received about the opposed leg members 36. The leg sections 63 are provided with two pairs of aligned connector and guide slots 48 so as to be slidable connected by a plurality, namely four, guide bolt members 64 to the respective leg members 36. The base section 61 is provided with a central indentation 66 to receive the adjustable bolt member 54 thereagainst.

The adjustable bolt member 54 is threadably received within the nut member 55 which, in turn, is secured as by welding to the upper surface of the support baseplate 47. The bolt member 54 is movable through the nut member 55 and a hole 67 in the baseplate 47 against the indentation 66 in the support bracket 52 to provide for vertical adjustable movement. The guard cover 57 is of an arcuate shape having the hinge section 59 connected through a hinge pin 69 to the support baseplate 47. An upper portion of the guard cover 57 is provided with a slot 71 to receive a hook member 73 therethrough which is secured to the support base 34 of the main body member 29. It is seen that the guard cover 57 is pivotal from the unattached to anchored conditions to cover the adjustable bolt member 54 and prevent the unauthorized rotation. This feature prevents the removal of the entire spare tire bracket apparatus 12 especially when the spare tire structure 20 is not mounted thereagainst.

The lateral support assembly 51 includes a rectangular backup plate 72 secured as by welding to the inclined guide plate 39; an adjustment plate 74 pivotally mounted in the connector holes 44 in the leg members 36 of the main body member 29; and an actuator nut 75 and bolt member 77 operably connected to the adjustment plate 74 and engageable with the backup plate 72. The backup plate 72 merely provides a hardened surface to receive the actuator bolt member 77 thereagainst. The adjustment plate 74 is provided with a main body section 79 having a curved hook section 81 at one end and a connector section 83 at the other end supporting a connector shaft 84. More particularly, the connector shaft 84 is received within the connector holes 44 to provide pivotal movement of the entire adjustment plate 74. The body section 79 is provided with a hole 86 to receive the actuator nut 75 by welding thereabout. The actuator bolt member 77 is threadably received within the nut member 75 so that the inner end portion engages the backup plate 72. It is noted that on rotation and resultant axial movement of the bolt member 77 towards the backup plate 72, the adjustment plate 74 rotates in a clockwise direction as viewed in FIG. 2 for securing to the sidewall 18 of the pickup truck structure 16 as will be explained.

As best shown in FIG. 2, the tire connector assembly 28 includes a yoke assembly 88 mountable within a respective pair of the adjustment holes 42 in the main body member 29; a threaded connector rod 89 connected to the yoke assembly 88; and a lock clamp assembly 92 adjustably mountable upon the threaded connector rod 89 and operable to secure the spare tire structure 20 thereto. The yoke assembly 88 includes a main yoke member 94 having a U-shaped body section with laterally extended, axially aligned, detent sections 97 mountable with the adjustment holes 42 in the main body member 29 for pivotal movement thereabout. Additionally, the yoke member 94 is provided with a threaded opening 98 adapted to receive the connector rod 89 therein and lock nuts 99 on opposite sides of the body section so as to secure the connector rod 89 in the adjusted condition. The threaded connector rod 89 has an outer end portion, indicated at 101, to receive the lock clamp assembly 92 thereon and secured in the clamped condition through a lock washer 103 and an anchor nut 105.

The lock clamp assembly 92 includes a baseplate member 107 pivotally connected by a hinge member to a cover plate 109 and a guard chain 110 to secure the baseplate member to the support base 34 of the main body member 29 for reasons to become obvious. The baseplate member 107 is provided with an arcuate body section 112 having a first hinge portion 114 at one end and a connector hook member 116 at the other. The arcuate body section 112 is provided with an elongated slot 118 to receive the outer end portion 101 of the threaded connector rod 89 therethrough. The cover plate 109 is provided with a main support section 119 having integral downwardly extended sidewalls 121 and an end wall 123. The end wall 123 is provided with a second hinge portion 125 to be pivotally connected by a hinge pin 127 to the first hinge portion 114 on the baseplate member 107. The main support section 119 is provided with an elongated slot 128 of a width less than the anchor nut 105 for reasons to become obvious plus an outer connector slot portion 130 to receive the hook member 116 therethrough to secure in the clamped condition through a padlock member 131. It is noted that the sidewalls 121 are adapted to abut the sides of the baseplate member 107 so as to prevent any tools or the like from reaching and rotating the anchor nut 105 when in the clamped condition.

Figure 10:
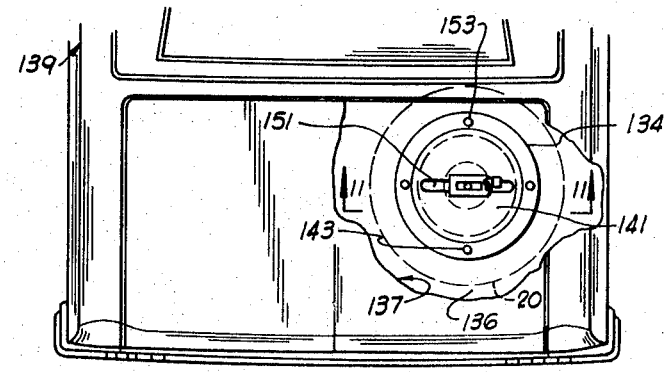
FIG. 10 is a fragmentary top plan view of a trunk area of an automotive vehicle having portions broken away to show a second embodiment of a spare tire bracket apparatus of this invention.
Figure 11:
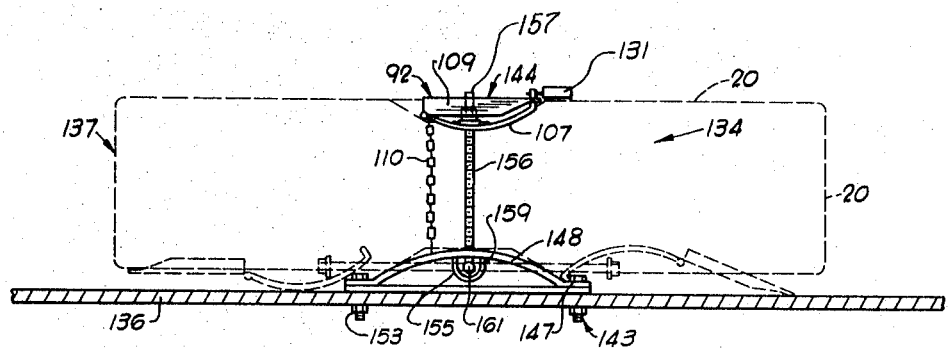
FIG. 11 is an enlarged fragmentary sectional view taken along line 11—11 in FIG. 10.

As shown in FIGS. 10 and 11, a second embodiment of a spare tire bracket apparatus 134 is indicated as mounted upon a support floor 136 in a trunk area 137 of an automotive vehicle indicated generally at 139. The spare tire bracket assembly 134 includes a main support assembly 141; an anchor assembly 143 to connect the support assembly 141 to the support floor 136; and a tire connector assembly 144 releasably connectable to the spare tire structure 20.

The support assembly 141 is provided with a generally circular body having an outer flange 147 integral with a central concave support section 148. The support section 148 is provided with a diametrically extended connector slot 151 to provide for proper movement of the tire connector assembly 28 as will be explained. The anchor assembly 143 includes a plurality of nut and bolt members 153 connected to the support flange 149 to secure the same in a desired position on the support floor 136.

The tire connector assembly 144 includes a connector bracket 155 secured to the underside of the concave support section 148; a threaded connector rod 156 pivotally connected to the connector bracket 155; through a yoke assembly 161; and the lock clamp assembly 92 secured to an outer end portion 157 of the threaded connector rod 156. The connector bracket 155 is provided with a pair of U-shaped hinge members 159 mounted on opposed sides of the connector slot 151. The threaded connector rod 156 is provided at its lower end with the laterally extended attachment shaft or yoke assembly 161 to be received within respective ones of the hinge members 159. It is seen that this pivotal movement of the threaded connector rod 156 allows a central portion thereof to be extended through the slot 151 when in the compact, nonuse condition shown in dotted lines in FIG. 11.

The lock clamp assembly 92 is substantially as described in the first embodiment in having the baseplate member 107 pivotally connected to the cover plate 109 with the guard chain 110 secured to the baseplate member 107 and the concave support section 148. Again, it is noted that the guard chain 110 is of a predetermined length to limit the rotational movement of the lock clamp assembly 92 to prevent unauthorized removal thereof.

In the use and operation of the spare tire bracket apparatus 12 of this invention as shown in FIG. 2, it is noted that the anchor assembly 26 may be adjustable so as to be in a relaxed or released condition on preparing to attach the same to the sidewall 18 of the pickup truck structure 16. More particularly, the actuator bolt member 77 of the lateral support assembly 51 shall be rotated so as to be moved outwardly relative to the nut member 75 so as to move the adjustment plate 74 adjacent the backup plate 72. Next, it is obvious that the adjustment bolt member 54 on the vertical support assembly 49 is rotated so as to be moved upwardly within the nut member 55 which, in turn, permits the support bracket 52 to be moved upwardly so as to decrease the overall vertical height of the entire bracket apparatus 12.

Next, it is obvious that the spare tire bracket apparatus 12 may be placed against the inner surface of the sidewall 18 of the pickup truck structure 16 having an upper portion adjacent the ledge 41. Thereupon, the adjustable bolt member 54 of the vertical support assembly 49 is rotated downwardly so as to move the upper ends of the curved portion 38 of the main body member 29 into abutting engagement with a lower surface 165 of the ledge 41 of the sidewall 18. After sufficient vertical rigidity is obtained through the vertical support assembly 49, it is obvious that the guard cover 57 can be moved to the security position of FIG. 5 and a padlock member 168 added thereto. Next, the actuator bolt member 77 is rotated to move inwardly towards the backup plate 72 which, in turn, would cause the adjustment plate 74 to rotate in a clockwise direction as viewed in FIG. 5. With this clockwise movement, there is provided a clamping force between the curve section 38 against an outer, downwardly depending leg 169 of the ledge 41. In this condition, the spare tire bracket apparatus 12 is securely attached to the sidewall 18 of the pickup structure 16 so as to be rigid without any relative movements which would result in undesirable noise and friction.

The next step is to attach the spare tire structure 20 to the bracket apparatus 12 to achieve the locked condition as shown in FIG. 1. It is understood that the spare tire structure 20 is provided with a wheel member 171 having a conventional central opening 173 with an outer rim to receive a tire member 175 thereon in a conventional manner.

As shown in FIG. 8, the lock clamp assembly 92 in the unlatched condition is moved about the connector rod 89 to achieve an overall narrow width as indicated by letter "A" in FIG. 8 which is less than the diameter of opening 173. In this condition, the lock clamp assembly 92 is movable through the opening 173 in the wheel member 171 through the opening 173 in the wheel member 171 and, next, the baseplate member 107 is pivoted to place an inner surface indicated at 177 against an adjacent portion of the contacting wheel member 171. The baseplate member 107 has a width "B" greater than the diameter of opening 173 for obvious reasons. The anchor nut 105 is rotated to move the same and the adjacent washer member 103 downwardly upon the threaded connector rod 89 to securely clamp the baseplate member 107 against the wheel member 171. The next step is to pivotally move the cover plate 109 about its hinge portions whereupon the hook member 116 is placed through the connector slot 130 whereupon the padlock member 131 may be secured thereto.

In the secured position as shown in FIG. 5, it is seen that the tire member 175 is adapted to contact the surface of the support bed 14, against an outer surface of the leg 169, and the lower wing sections 46 in a compact manner. In this condition, it is seen that the entire spare tire bracket apparatus 12 is substantially covered by the spare tire structure 20 except for the outer baseplate 107 and cover plate 109 secured by the padlock member 131. It is noted that the yoke member 94 is readily movable within the aligned connector holes 42 in the leg members 36 of the main body member 29 so as to adjust the same as required for tire structures of various sizes. Additionally, it is to be noted that the guard chain 110 connects the baseplate member 107 to the main body member 29 to limit rotation of the lock clamp assembly 92 which would prevent rotation of the anchor nut 105 and unauthorized entry thereto. The guard chain 110 permits only limited rotation due to its predetermined length. Also, it is to be noted that the sidewalls 121 of the cover plate 109 substantially covers the area between the baseplate member 107 so that no tool can be used to rotate the anchor nut 105 which would permit unauthorized removal of the spare tire structure 20.

In the second embodiment of the spare tire bracket apparatus 134 as shown in FIG. 10, the same is readily attached by the nut and bolt members 153 to the support floor 136 of the automotive vehicle 139. In this condition, it is seen that the lock clamp assembly 92 is connected to the threaded connector rod 156 which, in turn, is pivotally connected to the support section 148 so as to be movable from the nonuse condition as shown in dotted lines in FIG. 11 to the upright connected condition. The method of connecting the lock clamp assembly 92 to the spare tire structure 20 is substantially identical to that previously described in the first embodiment and further discussion thereof is not deemed necessary.

It is seen that the spare tire bracket apparatus of this invention is readily connectable to the trunk area of an automotive vehicle or to a sidewall of a pickup truck structure in a most efficient and effective manner to prevent unauthorized removal at all times. More particularly, the spare tire bracket apparatus provides efficient and effective means for adjustably connecting the same to the sidewall of a pickup truck structure having substantial vertical and lateral and stability. Also, it is seen that the spare tire bracket apparatus of this invention is easy to attach and detach from a vehicle structure; economical to manufacture; simple to adjust to various sizes of tire structure; easily attachable and detachable from a spare tire structure; and provided with anchor means to assure against unauthorized removal of the bracket apparatus with or without a spare tire structure attached thereto.

While the invention has been described in conjunction with preferred specific embodiments thereof, it will be understood that this discussion and description is intended to illustrate the invention, which is defined by the following claims.

I claim:

1. A spare tire bracket apparatus adapted to receive a tire structure thereon and connectable to a vehicle structure, comprising;
   a. a main support assembly,
   b. an anchor assembly to connect said support assembly to the vehicle structure,
   c. a tire connector assembly including a yoke assembly connected to said support assembly, a connector member connected to said yoke assembly, and a lock clamp assembly connected to said connector member and engageable with the tire structure,
   d. said lock clamp assembly including a baseplate member mounted about said connector member, a cover plate connected to said baseplate member, and a lock member mounted on said connector member,
   e. said baseplate member movable to a first position relative said connector member to a width to project through a central opening in a wheel member of the tire structure and movable to a second position having a width greater than the central opening to abut the wheel member, and
   f. said lock member movable on said connector member to anchor said baseplate member against the wheel member.

2. A spare tire bracket apparatus as described in claim 1, wherein;
   a. said cover plate movable into an overlapping position with said baseplate member to enclose said lock member, and
   b. said lock clamp assembly having an anchor member operably connected to said baseplate member and said cover plate to prevent removal of said lock member and the tire structure.

3. A spare tire bracket apparatus as described in claim 1, wherein;
   a. said lock clamp assembly having a guard chain connected to said support assembly and said baseplate member to limit rotation thereof on said connector member and prevent removal of the tire structure.

4. A spare tire bracket apparatus adapted to be connected to a sidewall in a pickup truck bed as described in claim 1, wherein;
   a. said support assembly having an elongated main body to be placed against the sidewall, and
   b. said anchor assembly includes a vertical support assembly to contact the truck bed and force said main body against a first portion of a ledge of the sidewall to restrict vertical movement and a lateral support assembly to contact the sidewall and a second portion of the ledge to restrict lateral movement.

5. A spare tire apparatus as described in claim 4, wherein;
   a. said vertical support assembly having a support bracket mounted about the lower end of said main body, an adjustable member connected to said main body and engageable with said support bracket to regulate vertical height of said bracket apparatus, a cover member connected to said main body to selectively cover and reveal said adjustable member, and an anchor member connected to said cover member when in the covered condition to prevent removal of said bracket apparatus.

6. A spare tire bracket apparatus as described in claim 4, wherein;
   a. said lateral support assembly having an adjustment plate connected to said main body and an actuator member connected to said adjustment plate and engageable with said main body, and
   b. said actuator member operable to vary the distance of a portion of said adjustment plate relative to said main body to clamp said bracket apparatus between the sidewall and the ledge.

7. A spare tire bracket apparatus as described in claim 1, wherein;
   a. said yoke assembly having a yoke member adjustable movable longitudinally of said support assembly and having a midportion to adjustable receive said connector member to accompany various sizes of tire structures.

8. A spare tire bracket apparatus as described in claim 7, wherein;
   a. said connector member being an elongated threaded rod, and
   b. said baseplate member and said cover plate having an elongated slot to receive said threaded rod therethrough and permit movement relative thereto.

9. A spare tire bracket apparatus as described in claim 1, wherein,
   a. said support assembly having a main body member,
   b. said connector member being a threaded rod with said yoke assembly secured to one end thereof pivotally connected to said body member, and
   c. said lock clamp assembly having a guard chain connected to said baseplate member and said main body member to restrict relative rotational movement to prevent unauthorized removal of the tire structure.

10. A spare tire bracket apparatus as described in claim 9, wherein;
    a. said main body member having an arcuate central section with an elongated slot therein to permit movement of said threaded rod, and
    b. a connector hinge secured to said central section to receive said connector shaft therein for pivotal movement.